(12) United States Patent
Flaherty

(10) Patent No.: US 8,890,050 B2
(45) Date of Patent: Nov. 18, 2014

(54) PHOTOSENSOR CIRCUITS INCLUDING A REGULATED POWER SUPPLY COMPRISING A POWER CIRCUIT CONFIGURED TO PROVIDE A REGULATED POWER SIGNAL TO A COMPARATOR OF A PULSE-WIDTH MODULATOR

(75) Inventor: Richard Charles Flaherty, Fuquay Varina, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 570 days.

(21) Appl. No.: 13/300,860

(22) Filed: Nov. 21, 2011

(65) Prior Publication Data

US 2013/0126715 A1 May 23, 2013

(51) Int. Cl.
*G01J 1/44* (2006.01)
*G01J 1/32* (2006.01)
*H05B 37/02* (2006.01)

(52) U.S. Cl.
CPC ............. *H05B 37/0218* (2013.01); *Y02B 20/46* (2013.01)
USPC ......... 250/214 R; 250/205; 315/307; 315/291

(58) Field of Classification Search
CPC .... H05B 37/0218; H05B 37/02; Y02B 20/46; Y02B 20/40; H01J 31/00; H01J 40/14; G01J 1/44; G01J 1/42; G01J 1/32
USPC ............... 250/214 R, 205, 206, 214 D, 214.1, 250/214 AL, 214 DC, 214 SW, 214 LS; 307/117; 363/19, 16, 21.11, 21.1, 97; 315/159, 149, 150, 158, 360, 307, 291; 327/514, 509
See application file for complete search history.

(56) References Cited

U.S. PATENT DOCUMENTS 3,753,012 A   8/1973   Frederiksen et al.
3,915,540 A   10/1975  Thompson et al.

(Continued)

FOREIGN PATENT DOCUMENTS

DE        42 21 137 A1    1/1994
DE   10 2007 060 201 A    6/2009

(Continued)

OTHER PUBLICATIONS

International Search Report and Written Opinion (11 pages) corresponding to International Application No. PCT/US2012/065315; Mailing Date: Mar. 8, 2013.

(Continued)

*Primary Examiner* — Que T Le
*Assistant Examiner* — Jennifer Bennett
(74) *Attorney, Agent, or Firm* — Myers Bigel Sibley & Sajovec, P.A.

(57) ABSTRACT

Photosensor circuits include a relay coil configured to control application of an alternating current (AC) power source to a load. The circuit includes a pulse width modulator circuit configured to generate a pulse width modulated signal having a pulse width that varies responsive to an average voltage across the relay coil. A drive transistor coupled to the relay coil controls the average voltage across the relay coil responsive to the pulse width modulated signal. A photo control circuit is configured to control application of the pulse width modulated signal to the drive transistor responsive to a detected light level. A power circuit coupled to the power source is configured to provide a regulated power signal to a comparator of the pulse width modulator circuit.

14 Claims, 4 Drawing Sheets

(56) References Cited

U.S. PATENT DOCUMENTS

| | | |
|---|---|---|
| 4,300,090 A | 11/1981 | Weber |
| 4,342,906 A | 8/1982 | Hyatt |
| 4,653,834 A | 3/1987 | Norden |
| 4,887,046 A * | 12/1989 | Gilliland ............... 330/252 |
| 4,961,623 A | 10/1990 | Midkiff et al. |
| 4,986,761 A | 1/1991 | Gladden, Jr. et al. |
| 4,991,928 A | 2/1991 | Zimmer |
| 5,181,272 A | 1/1993 | Hopper |
| 5,235,665 A | 8/1993 | Marchesi et al. |
| 5,271,080 A | 12/1993 | Hopper et al. |
| 5,590,234 A | 12/1996 | Pulido |
| 5,638,477 A | 6/1997 | Patterson et al. |
| 5,684,911 A | 11/1997 | Burgett |
| 5,751,118 A | 5/1998 | Mortimer |
| 5,790,741 A | 8/1998 | Vincent et al. |
| 5,793,920 A | 8/1998 | Wilkins et al. |
| 6,091,876 A | 7/2000 | Hizuka et al. |
| 6,363,198 B1 | 3/2002 | Braga et al. |
| 6,466,727 B1 | 10/2002 | Leeb |
| 6,663,405 B1 | 12/2003 | Robinson et al. |
| 6,829,424 B1 | 12/2004 | Finzel et al. |
| 6,903,942 B2 | 6/2005 | Flaherty |
| 6,997,739 B2 | 2/2006 | Hoxha |
| 7,016,802 B2 | 3/2006 | Flaherty |
| 7,054,169 B2 | 5/2006 | Huh et al. |
| 7,221,111 B2 | 5/2007 | Hirosawa |
| 7,251,411 B1 | 7/2007 | Lu et al. |
| 7,270,485 B1 | 9/2007 | Robinson et al. |
| 7,317,863 B2 | 1/2008 | Lu et al. |
| 7,356,237 B2 | 4/2008 | Mullaney et al. |
| 7,477,826 B2 | 1/2009 | Mullaney et al. |
| 7,503,707 B2 | 3/2009 | Ray et al. |
| 7,738,761 B2 | 6/2010 | Mullaney et al. |
| 7,804,200 B2 | 9/2010 | Flaherty |
| 7,925,135 B2 | 4/2011 | Mullaney et al. |
| 8,026,470 B2 | 9/2011 | Flaherty |
| 8,143,568 B2 | 3/2012 | Flaherty |
| 8,304,996 B2 * | 11/2012 | Flaherty ............... 315/149 |
| 2002/0039476 A1 | 4/2002 | Sauve et al. |
| 2003/0128555 A1 | 7/2003 | Schemmann et al. |
| 2004/0149486 A1 | 8/2004 | Douglas et al. |
| 2004/0155638 A1 | 8/2004 | Flaherty |
| 2004/0170369 A1 | 9/2004 | Pons |
| 2005/0088856 A1 * | 4/2005 | Yamamoto et al. ............. 363/19 |
| 2005/0207711 A1 | 9/2005 | Vo et al. |
| 2005/0266716 A1 | 12/2005 | Hoxha |
| 2005/0282430 A1 | 12/2005 | Hoxha |
| 2006/0246771 A1 | 11/2006 | Pepe et al. |
| 2006/0283619 A1 | 12/2006 | Kowalczyk et al. |
| 2007/0177847 A1 | 8/2007 | Krampotich et al. |
| 2008/0170832 A1 | 7/2008 | Mullaney et al. |
| 2008/0181570 A1 | 7/2008 | Mullaney |
| 2009/0261660 A1 | 10/2009 | Flaherty |
| 2010/0097122 A1 | 4/2010 | Flaherty |
| 2010/0283328 A1 | 11/2010 | Eggert |
| 2011/0187272 A1 | 8/2011 | Flaherty |

FOREIGN PATENT DOCUMENTS

| | | |
|---|---|---|
| EP | 1 184 964 A2 | 3/2002 |
| EP | 1 376 175 A2 | 1/2004 |
| FR | 2 273 386 A | 12/1975 |
| JP | 60-067911 | 4/1985 |
| JP | 03-167507 | 7/1991 |
| WO | WO 2004/003617 A1 | 1/2004 |
| WO | WO 2004/081614 A2 | 9/2004 |
| WO | WO 2005/001533 | 1/2005 |
| WO | WO 2007/050537 A2 | 5/2007 |
| WO | WO 2009/029258 A1 | 3/2009 |

OTHER PUBLICATIONS

International Preliminary Report on Patentability (7 pages) corresponding to International Application No. PCT/US2012/065315; Mailing Date: May 27, 2014.

"Ready Reference Guide, Photo controls and Light Products," http://energy.tycoelectronics.com/rrg/alr_rrg/mainindx.pdf, Copyright 2001, Tyco Electronics.

International Search Report and Written Opinion (14 pages) corresponding to International Application No. PCT/US2009/002435; Mailing Date: Jun. 26, 2009.

International Search Report and Written Opinion (16 pages) corresponding to International Application No. PCT/US2008/010103; Mailing Date: Dec. 18, 2008.

International Search Report and Written Opinion for corresponding PCT Application No. PCT/US2009/005625 dated May 19, 2010.

International Search Report and Written Opinion of the International Searching Authority issued by the European Patent Office on Feb. 4, 2010 for corresponding PCT application No. PCT/US2009/004929.

International Search Report and Written Opinion of the International Searching Authority issued by the European Patent Office on Apr. 1, 2010 for corresponding PCT application No. PCT/US2009/066950.

International Search Report and Written Opinion of the International Searching Authority for International Application No. PCT/US2011/023293; Date of Mailing: Apr. 15, 2011; 11 pages.

Notification of Transmittal of the International Search Report and the Written Opinion of the International Searching Authority, or the Declaration, in corresponding PCT Application No. PCT/US2010/026143, mailed Jun. 8, 2010, 12 pages.

* cited by examiner

US 8,890,050 B2

PHOTOSENSOR CIRCUITS INCLUDING A REGULATED POWER SUPPLY COMPRISING A POWER CIRCUIT CONFIGURED TO PROVIDE A REGULATED POWER SIGNAL TO A COMPARATOR OF A PULSE-WIDTH MODULATOR

BACKGROUND OF THE INVENTION

The present invention relates to photosensor circuits and, more particularly, photosensor circuits for light level switching control.

Photo controllers are devices that automatically turn electrical devices on and off in response to the ambient light level. They are used, for example, on street lights to automatically turn them off during the day and on at night. They are also used on billboard lighting systems to turn the billboard lights on early at night, off late at night during periods of low vehicular traffic, on again during early morning rush hour periods when high traffic levels resume, and then off during the daylight hours. Photo controllers may also be used in reverse, for example, to turn a golf course water fountain on during the day and off at night.

A variety of devices, including photo controllers, may make use of power converters to convert relatively high voltage alternating current to relatively low voltage direct current as is used in many conventional electronic devices. Some conventional power converters make use of large, high-voltage resistors to drop the voltage. However, these resistors are typically inefficient and generate high heat. The heat generated from the resistors may require that the resistors be housed in a large package and include heat dissipating elements, such as heat sinks. Also, the high heat generated by the resistors can lead to problems with reliability and longevity in the resistors and in other electronic components situated near the resistors.

Another conventional approach to power conversion is the use of a switch mode power converter. The switch mode power converters typically require six transistors or a microcontroller to implement. The requirement for multiple transistors or a micro-controller may cause the implementation of switch mode power converters to be cost prohibitive in some applications, such as in photo controllers.

A small, low cost, efficient switch mode power converter and a photosensor circuit including the same are described in U.S. Pat. No. 6,903,942 ("the '942 patent"), which is hereby incorporated herein by reference as if set forth in its entirety.

It is also known to provide a photosensor circuit including digital circuitry as incorporated in the 3100 Series photocontrol, available from TE Connectivity. The photosensor circuit for the 3100 Series photocontrol is shown in FIG. 1. As seen in FIG. 1, a microcontroller U1 outputs a signal GP4 that drives a drive transistor Q2 to turn on and off the drive transistor Q2 as part of a pulse width modulated control circuit including capacitors C5 and C6 and diode D2 (operating at a frequency of approximately 50 Hertz (Hz) to control the voltage across the relay coil of the relay K1. Relay K1 is shown as a normally open relay and, when light is detected by phototransistor Q1, the coil current of relay K1 is turned off to turn off a load LOAD, such as a street light. A direct drive signal is provided by including capacitor C3 to adjust voltage levels of the signal to the base of the drive transistor Q2 from the signal GP4. In addition, a half wave rectifier (diode D1) is included to provide power for the photocontrol circuit.

A regulated power supply is also shown to provide the power supply signals VSS and VDD to allow operation of the microcontroller U1. In the illustrated embodiment, VSS is coupled to the AC line NEUTRAL to provide the DC ground reference. The VDD signal is provided by the resistor R7 coupled to the half wave rectifier D1. In addition, The VDD signal is coupled to the emitter of the drive transistor Q2. As such, current will also be provided through the drive transistor Q2 but only when the transistor is on.

A small, low cost, efficient switch mode power converter including a regulated power source for a microcontroller is also described in co-pending U.S. patent application Ser. No. 13/190,727 ("the '727 application"), which is hereby incorporated herein by reference as if set forth in its entirety.

Regulated power sources may also be used in photocontroller circuits not including a microcontroller, such as described in U.S. Pat. No. 8,026,470 ("the '470 patent"), which is hereby incorporated herein by reference as if set forth in its entirety.

SUMMARY OF THE INVENTION

Embodiments of the present invention provide photosensor circuits including a relay coil configured to control application of an alternating current (AC) power source having a negative half and a positive half of a line cycle to a load. A pulse width modulator circuit of the photosensor circuit is configured to generate a pulse width modulated signal having a pulse width that varies responsive to an average voltage across the relay coil. The pulse width modulator circuit includes a comparator. A drive transistor coupled to the relay coil that controls the average voltage across the relay coil responsive to the pulse width modulated signal. A photo control circuit of the photosensor circuit is configured to control application of the pulse width modulated signal to the drive transistor responsive to a detected light level. A power circuit, coupled to the power source, is configured to provide a regulated power signal to the comparator of the pulse width modulator circuit. The power circuit includes the drive transistor coupled between the relay coil and the regulated power signal and a second transistor coupled between a base of the drive transistor and the regulated power signal. The drive transistor conducts current passing through the relay coil to the regulated power signal when the drive transistor is on and the second transistor conducts current not passing through the relay coil to the regulated power signal when the drive transistor is turned off.

DETAILED DESCRIPTION OF EMBODIMENTS OF THE INVENTION

Figure 1:
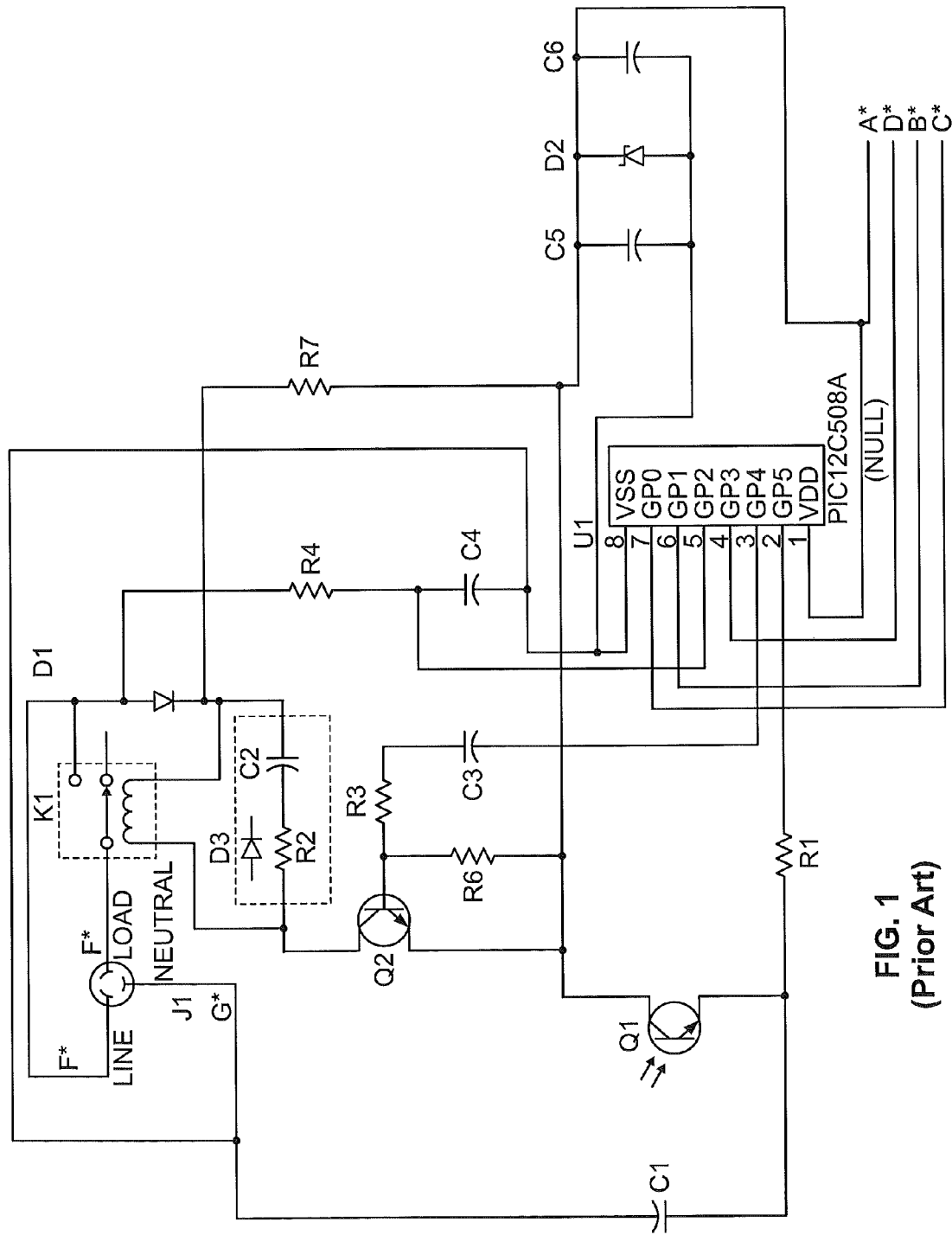
FIG. 1 is a circuit diagram of a photosensor circuit according to the prior art.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
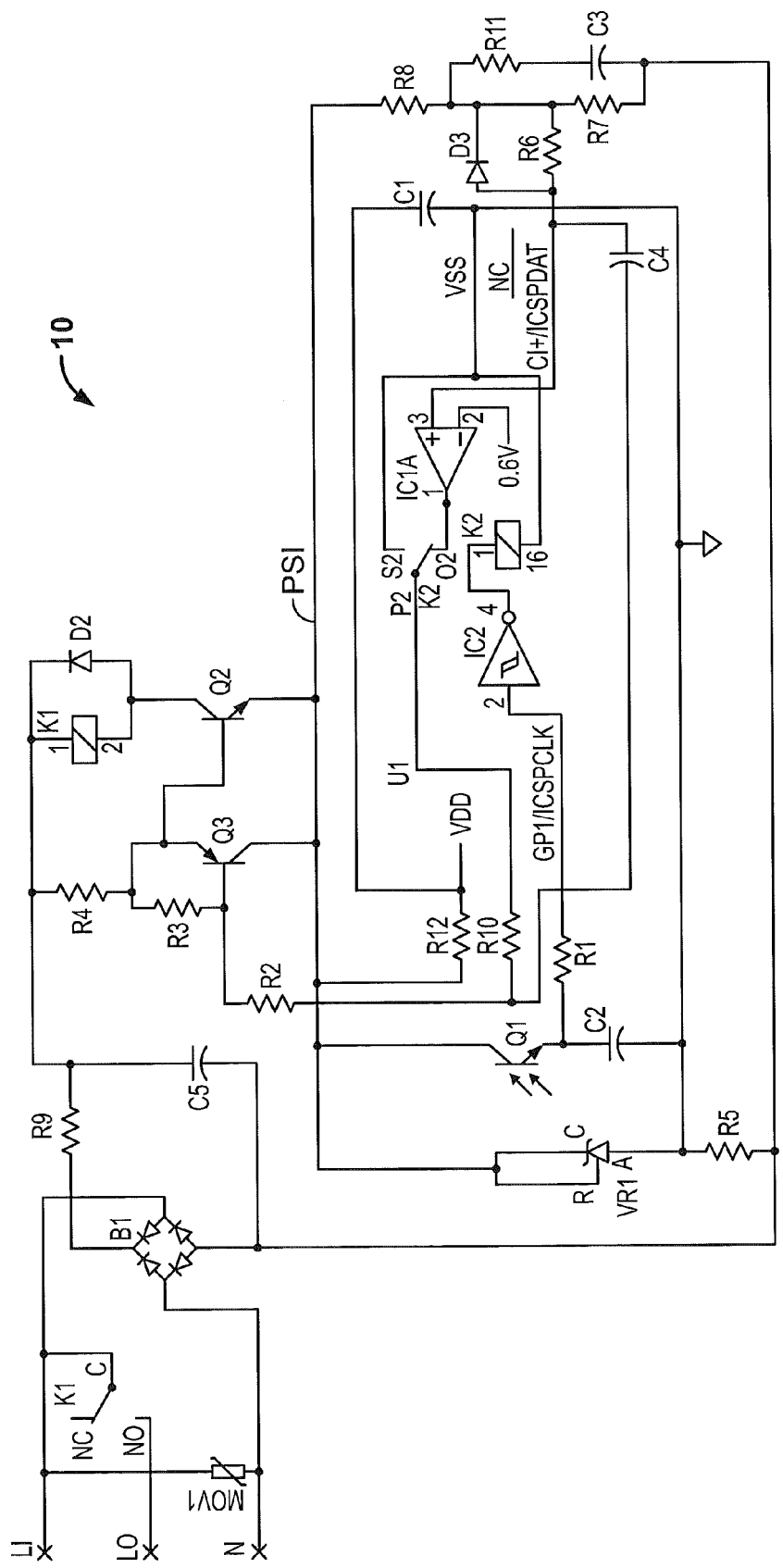
FIG. 2 is a circuit diagram of a photosensor circuit according to some embodiments of the present invention.

Embodiments of the present invention will now be described with reference to FIGS. 2-3. In particular, the embodiments of FIG. 2 illustrate a photosensor circuit 10 for street lamp control in which a normally open relay is provided where current flows through a relay coil K1 during the night to turn on a street lamp (or other load) and during the day the coil current of K1 is interrupted causing the street lamp to turn off. It will be understood, however, that some embodiments use a normally closed relay. The relay coil K1 is configured to control application of an alternating current (AC) power source applied between LI and N to a load connected between LO and N. A diode D2 is shown coupled across the relay to provide a buck converter. A circuit protection device MOV1 is also shown. While the switch associated with the relay coil K1 is shown apart therefrom in FIG. 2 for illustrative purposes, it will be understood that the coil K1 and switch are components of the relay and, as such, the notation K1 is also shown adjacent the streetlamp power switch in FIG. 2.

As will be described below, the circuit 10 illustrated in FIG. 2 includes a photo sensor, logic circuitry, and an electrical switch. In the illustration, the photo sensor is a phototransistor Q1, the logic circuitry is a microcontroller U1, and the electrical switch is an electromagnetic relay. To simplify understanding, some functional blocks are schematically illustrated as discrete components in FIG. 2. However, it will be understood that the microcontroller U1 may be a programmable device such as a PIC10D206 available from Microchip Technology, Inc., which device may include an on chip analog comparator, represented in FIG. 2 as the comparator IC1A having one input coupled to a voltage reference of 0.6 volts (V) also provided by the microcontroller U1 as well as a programmable microcontroller. As such, the illustrated isolation resistors R1, R10, R12 are provided solely to allow reliable programming of the microcontroller U1 and do not otherwise substantially affect circuit operation during normal operation after programming is completed.

Such embodiments may be designed to function at any line voltage between 105 and 305 VAC and, as such, are shown as including a switch mode regulator circuit. For the illustrated embodiments below, most of the control circuit is contained within microcontroller U1. As such, in the discussion of the respective circuits below, it will be understood that the microcontroller U1 acts as part of various circuits along with the discrete components identified below as included in the respective circuits.

A pulse width modulator circuit R6-R8, R11, D3, C3-C4 is provided to control the operation of the relay coil K1. The pulse width modulator circuit further includes the analog comparator IC1A. The illustrated pulse width modulator circuit R6-R8, R11, D3, C3-C4 is a switch mode relay coil current regulator that is configured to generate a pulse width modulated signal having a pulse width that varies responsive to an average voltage across the relay coil at a set frequency for the pulse width modulated signal.

A drive transistor Q2 coupled to the relay coil K1 controls the average voltage across the relay coil K1 responsive to the pulse width modulated signal. A photo control circuit Q1, C2, U1/IC2 is provided that is configured to control application of the pulse width modulated signal to the drive transistor Q2 responsive to a detected light level. A power circuit R2-R4, Q3 (and drive transistor Q2) coupled to the power source is configured to provide a regulated power signal PS1 (VDD (high) referenced to VSS (low)). References herein to the regulated power signal PS1, unless stated otherwise, are references to the circuit node corresponding to the voltage level VDD of the regulated power signal.

The photo control circuit includes a phototransistor Q1 coupled to the microcontroller U1. The phototransistor Q1 has a first terminal coupled to the regulated power signal PS1 (VDD) and a second terminal that outputs a current responsive to a level of light detected by the phototransistor. More particularly, in the illustrated embodiments of FIG. 2, the photo control circuit further includes a resistor R1 coupled between the microcontroller U1 and the second terminal of the phototransistor Q1 and a charge capacitor C2 coupled between the second terminal of the phototransistor Q1 and the low voltage reference VSS of the regulated power signal PS1 and current flowing through the phototransistor Q1 charges the charge capacitor C2 so that the microcontroller can detect the light level.

The microcontroller U1 is configured to measure the detected light level and to turn off the drive transistor Q2 responsive to the detected light level meeting a selected condition. In the illustrated embodiments, the microcontroller U1 is configured to periodically discharge the charge capacitor C2 and to measure a voltage across the charge capacitor C2 a selected time after the charge capacitor C2 is discharged to measure the detected light level. The microcontroller U1 turns off the drive transistor Q2 (causing the normally open relay to return to the open state) by coupling the base of the second transistor Q3 to a logic low, which turns on the second transistor Q3, which in turn turns off the drive transistor Q2 (essentially coupling both the base and emitter of the drive transistor Q2 to the regulated power supply PS1 (VDD)). To operate the relay to switch to the closed position (i.e., turn on a light or other load), the microcontroller U1 applies the pulse width modulated signal to the base of the second transistor Q3. While this may be done by digital logic, this operation is illustrated schematically in FIG. 2 by a relay K2 switching the drive signal between the output of the comparator IC1A and VSS. The driving of the coil of relay K2 is illustrated as being responsive to the hysteresis inverter IC2 responsive to the detection of the detected light level. It will be understood that a variable delay time before switching may be programmed into the microcontroller and/or an asymmetric switching delay (turning on delay differs from turning off delay).

Using the configuration described above, embodiments may provide a photosensor circuit that is a street lighting photo control device and the load is street lighting (street lamp). The relay coil is configured to activate to switch on the street lighting responsive to detection of less than a minimum light level by the phototransistor.

By using a microcontroller instead of an analog circuit, a wider variety of delay times may be provided. In addition, a pulse width modulated signal at much higher than line frequencies may be more readily provided. As a normally open relay may be more subjected to connection reliability problems, a higher frequency may make operation of the device more reliable. In some embodiments, the pulse width modulator circuit is configured to control a frequency of the pulse width modulated signal and the frequency of the pulse width modulated signal is at least about 500 Hertz (Hz). To support programming of the microcontroller U1, three isolation resistors R1, R10, R12 are shown in FIG. 2.

A power circuit R2-R4, Q3 (and drive transistor Q2) coupled to the power source is configured to provide a regulated power signal PS1 (VDD (high) referenced to VSS (low)) to the microcontroller U1 including the comparator IC1A of the pulse width modulator circuit. In the illustrated embodiments, the resistors R2-R4 and the second transistor Q3 are arranged as a level shifter power scavenger circuit. The power circuit includes the drive transistor Q2 coupled between the relay coil K1 and the regulated power signal PS1 and the second transistor Q3 coupled between a base of the drive transistor Q2 and the regulated power signal PS1. As such, the drive transistor Q2 conducts current passing through the relay coil K1 to the regulated power signal PS1 when the drive transistor Q2 is on and the second transistor Q3 conducts current not passing through the relay coil K1 to the regulated power signal PS1 when the drive transistor Q2 is turned off.

In some embodiments, the power circuit includes a rectifier, shown in FIG. 2 as a full-wave rectifier B1. The rectifier B1 is included in a full waver power supply filter bridge rectifier including resistor R9 and capacitor C5. A shunt regulator, shown as a Zener diode VR1, is coupled between VSS and VDD and a current shunt R5 is shown coupled between VSS and the rectifier B1.

For the illustrated power circuit of FIG. 2, a collector of the second transistor Q3 is coupled to the base of the drive transistor Q2. An emitter of the second transistor Q3 is coupled to the regulated power signal PS1. An output of the comparator IC1A is coupled to the base of the second transistor Q3. The power circuit further includes a first resistor R4 coupled between the rectifier B1 and the base of the drive transistor Q2, a second resistor R3 coupled between the base of the drive transistor Q2 and the base of the second transistor Q3 and a third resistor R2 coupled between the output of the comparator IC1A and the base of the second transistor Q3.

As described above and more particularly with reference to a PIC10F206 microcontroller U1, the analog comparator IC1A is connected to the U1 terminal referenced as CI+ and GP2. The internally generated voltage reference is connected internally to the negative comparator input. The switch mode regulation function is performed by the internal analog comparator IC1A and voltage reference (0.6V) and not by the microcontroller digital logic, which may be turned off when not needed to save power (sleep mode). The microcontroller digital logic is used to interface with the phototransistor Q1 and causes the terminal referenced as GP2 to be internally connected to the comparator output during the night, resulting in the relay turning on the street lamp (or other load). During the day the microcontroller digital logic will output a logic low through the terminal referenced as GP2, causing the relay to turn off the street lamp.

Figure 4A:
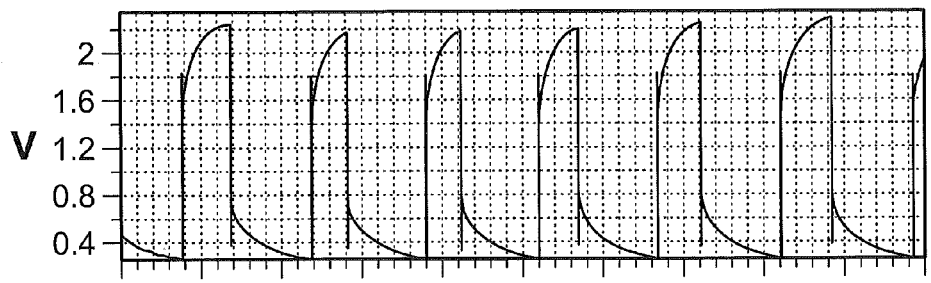
FIGS. 4A to 4E are timing diagrams of the photosensor circuit of FIG. 1.
Figure 4B:
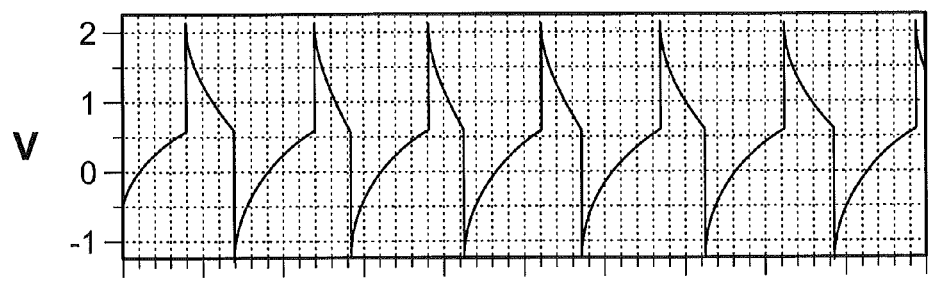
Figure 4C:
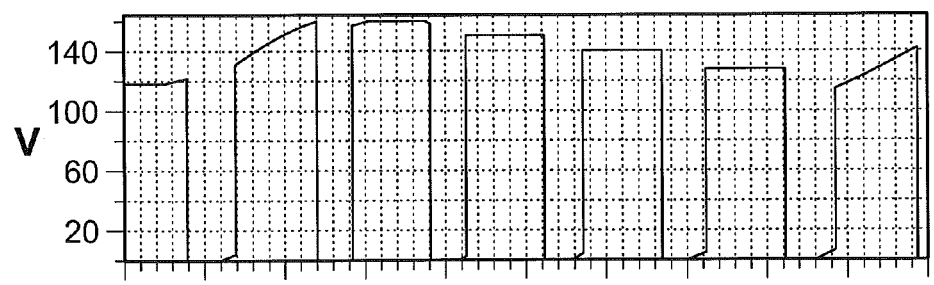
Figure 4D:
Figure 4E:
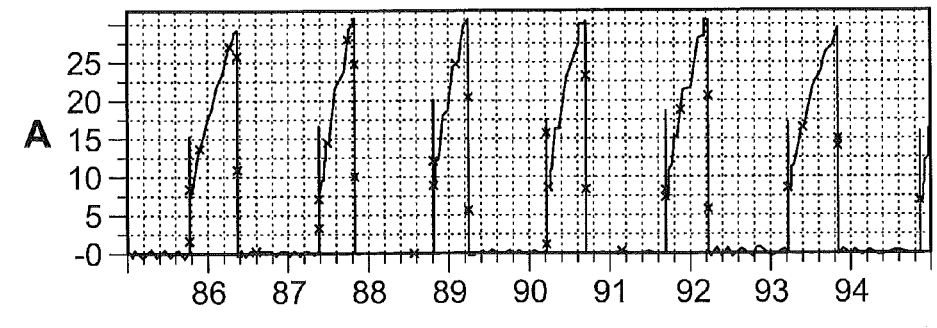

Timing diagrams simulating operation of the circuit of FIG. 2 when the relay is activated (current flowing through relay coil K1) are shown in FIGS. 4A to 4D. FIG. 4A illustrates the voltage at the output of the analog comparator IC1A. FIG. 4B illustrates the voltage at the positive comparator input of the pulse width circuit comparator IC1A. FIG. 4C illustrates the voltage across the drive transistor Q2. FIG. 4D illustrates voltage at terminal 1 of the relay coil K1 (cathode of diode D2). FIG. 4E illustrates the current through the drive transistor Q2.

Figure 3:
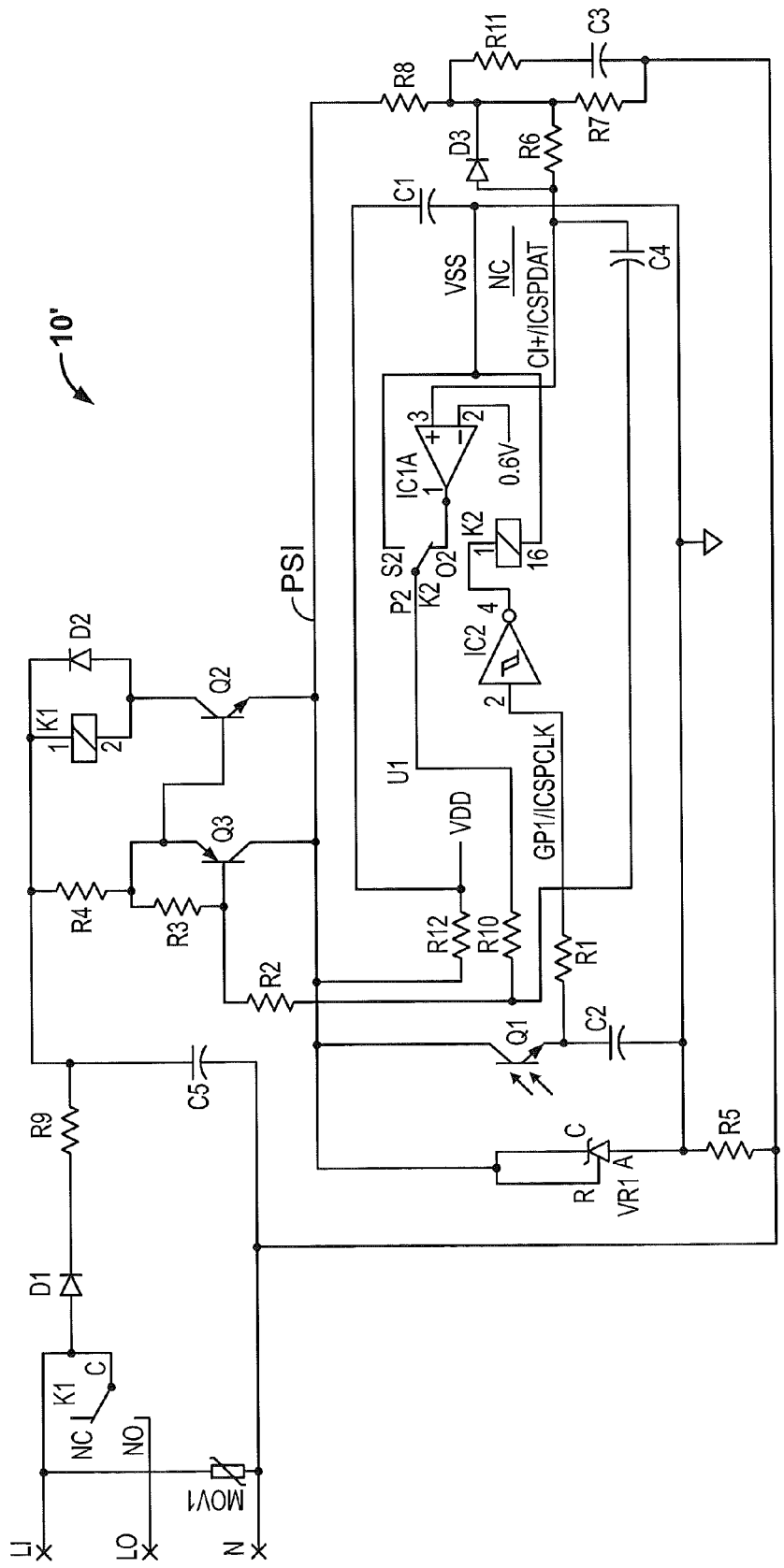
FIG. 3 is a circuit diagram of a photosensor circuit according to some embodiments of the present invention.

Further embodiments of a photosensor circuit 10' are shown in the circuit diagram of FIG. 3. The embodiments of FIG. 3 differ from the embodiments of FIG. 2 in that the photosensor circuit 10' includes a half-wave rectifier D1 instead of the full-wave rectifier B1.

Embodiments of the present invention as described above also may eliminate the use of aluminum electrolytic type capacitors in the photosensor circuit. As the technology of street lighting advances, more efficient and longer life lamps are being introduced. While previously a typical street lamp generally lasted three years before replacement was necessary, new street lamps last as long as 20 years. Accordingly, a photocontrol that can be guaranteed for a 20-year life may also be desirable. Such an extended life may be provided by embodiments as illustrated in FIGS. 2 and 3.

In contrast, typical conventionally available photocontrols contain aluminum electrolytic capacitors. Such photocontrols are generally rated at a lifetime of 5,000 hours (208 days). By operating photocontrols at much lower voltages and temperatures than their maximum ratings, they typically last up to three years but not the desired 20 years. By allowing practical use of long-life capacitors, such as ceramic-type capacitors, circuit life can be significantly increased as ceramic capacitors typically last extreme lengths of time. Furthermore, as new LED-type lamps tend to be lower in power, the power dissipation component of the photocontrol circuit itself becomes a greater percentage of the total efficiency equation for the lighting. As such, reductions of energy consumption of the photocontrol circuit are also beneficial.

Particular aspects of the illustrated embodiments as contrasted with the circuit of FIG. 1 allowing use of ceramic capacitors will now be described. The VDD filter capacitor C1 may be changed from an aluminum electrolytic type to a very long life ceramic type in a variety of ways on different embodiments. For example, with reference to FIG. 2 as contrasted with FIG. 1, replacing half wave rectification with full wave rectification doubles the ripple frequency, which may allow the VDD filter capacitor C1 value to be halved. With reference to both FIGS. 2 and 3, the capacitor C5 was added, allowing current to continue flowing into the regulated power supply PS1 (VDD) even during the zero-cross-over of the line voltage allowing the value of the VDD filter capacitor C1 to be reduced. In addition, allowing the microcontroller U1 digital logic to be turned off much of the time reduces the required power, allowing a smaller value of the VDD filter capacitor, C1. In addition, the circuit of FIG. 1 uses capacitive coupling between the control circuit and the relay coil drive transistor Q2, which calls for the use of an aluminum electrolytic type capacitor. The need for such an aluminum electrolytic type capacitor may be eliminated by use of the level shifter circuit R2, R3, R4, Q3.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A photosensor circuit, comprising:
    a relay coil configured to control application of an alternating current (AC) power source having a negative half and a positive half of a line cycle to a load;
    a pulse width modulator circuit configured to generate a pulse width modulated signal having a pulse width that varies responsive to an average voltage across the relay coil, the pulse width modulator circuit including a comparator;
    a drive transistor coupled to the relay coil that controls the average voltage across the relay coil responsive to the pulse width modulated signal;
    a photo control circuit configured to control application of the pulse width modulated signal to the drive transistor responsive to a detected light level; and
    a power circuit, coupled to the power source, that is configured to provide a regulated power signal to the comparator of the pulse width modulator circuit, wherein the power circuit includes the drive transistor coupled between the relay coil and the regulated power signal and a second transistor coupled between a base of the drive transistor and the regulated power signal and wherein the drive transistor conducts current passing through the relay coil to the regulated power signal when the drive transistor is on and the second transistor conducts current not passing through the relay coil to the regulated power signal when the drive transistor is turned off.

2. The photosensor circuit of claim 1, wherein the power circuit includes a rectifier coupled to the AC power source.

3. The photosensor circuit of claim 2, wherein the rectifier comprises a full-wave rectifier.

4. The photosensor circuit of claim 2, wherein a collector of the second transistor is coupled to the base of the drive transistor, an emitter of the second transistor is coupled to the regulated power signal and an output of the comparator is coupled to the base of the second transistor and wherein the power circuit further comprises a resistor coupled between the base of the second transistor and the rectifier.

5. The photosensor circuit of claim 4, wherein the resistor comprises a first resistor and a second resistor and wherein the first resistor is coupled between the rectifier and the base of the drive transistor and the second resistor is coupled between the base of the drive transistor and the base of the second transistor.

6. The photosensor circuit of claim 5, wherein the power circuit further comprises a third resistor coupled between the output of the comparator and the base of the second transistor.

7. The photosensor circuit of claim 2, wherein the pulse width modulator circuit is configured to control a frequency of the pulse width modulated signal and wherein the frequency of the pulse width modulated signal is at least about 500 Hertz (Hz).

8. The photosensor circuit of claim 7, wherein the photosensor circuit includes a relay including the relay coil and wherein the relay comprises a normally open relay.

9. The photosensor circuit of claim 7, wherein the photosensor circuit comprises a street lighting photo control device and the load comprises street lighting and the relay coil is configured to activate to switch on the street lighting responsive to detection of less than a minimum light level by the phototransistor.

10. The photosensor circuit of claim 2, wherein the photo control circuit includes:
    a phototransistor having a first terminal coupled to the regulated power signal and a second terminal that outputs a current responsive to a level of light detected by the phototransistor; and
    a microcontroller configured to measure the detected light level and to turn off the drive transistor responsive to the detected light level meeting a selected condition, wherein the power circuit is configured to provide the regulated power signal to the microcontroller.

11. The photosensor circuit of claim 10, wherein the microcontroller is configured to disconnect the output of the comparator from the base of the second transistor to turn off the drive transistor.

12. The photosensor circuit of claim 10, wherein the photo control circuit further includes:
    a resistor coupled between the microcontroller and the second terminal of the phototransistor and a charge capacitor coupled between the second terminal of the phototransistor and a low voltage reference of the regulated power signal, wherein current flowing through the phototransistor charges the charge capacitor; and
    wherein the microcontroller is configured to periodically discharge the charge capacitor and to measure a voltage across the charge capacitor a selected time after the charge capacitor is discharged to measure the detected light level.

13. The photosensor circuit of claim 10, wherein the microcontroller is configured to turn off the drive transistor at a selected delay time after the detected light level is determined to meet the selected condition.

14. The photosensor circuit of claim 10, wherein the comparator and the microcontroller are included in a single microcontroller chip.

* * * * *